H. R. MEYER.
SYSTEM OF CONTROL.
APPLICATION FILED NOV. 4, 1918.
1,396,866.
Patented Nov. 15, 1921.
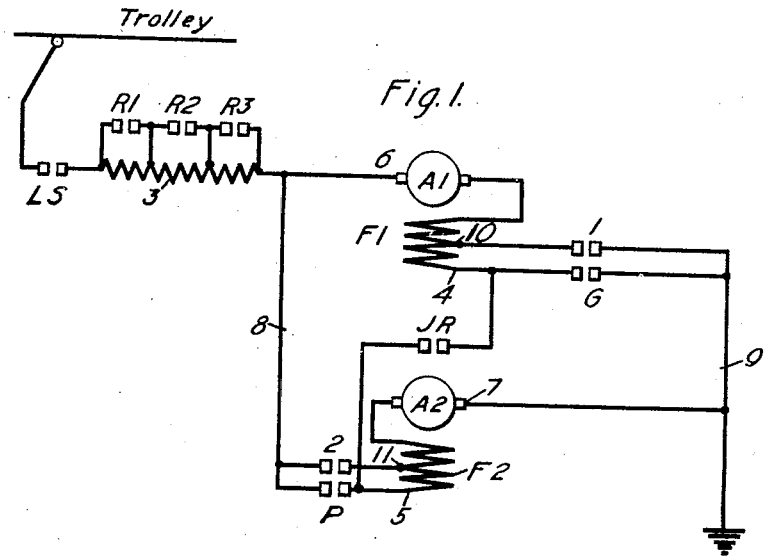
INVENTOR
Harry R. Meyer
BY
Wesley G. Carr
ATTORNEY
WITNESSES:
H. J. Shelhamer
W. R. Coley

UNITED STATES PATENT OFFICE.

HARRY R. MEYER, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,396,866.   Specification of Letters Patent.   Patented Nov. 15, 1921.

Application filed November 4, 1918. Serial No. 260,944.

*To all whom it may concern:*

Be it known that I, HARRY R. MEYER, a citizen of the United States, and a resident of Wilkinsburg, in the county of Allegheny and State of Pennsylvania, have invented a new and useful Improvement in Systems of Control, of which the following is a specification.

My invention relates to systems of control and particularly to electric railway motors of the well-known field-control type.

The object of my invention is to provide a relatively simple and inexpensive control system of the above-indicated character, whereby, in particular, a certain number of unit switches, or the equivalent, are eliminated with respect to prior systems for accomplishing the same results.

My invention may best be understood by reference to the accompanying drawing, wherein Figure 1 is a diagrammatic view of the main circuits of a control system embodying my invention, and Fig. 2 is a sequence chart, of well-known form, serving to indicate the preferred order of operation of the switches that are illustrated in Fig. 1.

Referring to the drawing, the system shown comprises suitable supply-circuit conductors respectively marked "Trolley" and "Ground"; a plurality of dynamo-electric machines respectively having commutator-type armatures A1 and A2 and plural-section field windings F1 and F2; an accelerating resistor 3; a line switch LS; a plurality of resistor-short-circuiting switches R1, R2 and R3; a "series-connecting" switch JR; a pair of "parallel-connecting" switches P and G; and a pair of "field-control" switches 1 and 2.

The "series-connecting" switch JR is adapted to join the outer terminals 4 and 5 of the field windings F1 and F2 to connect the motors in series relation. The outer terminals 6 and 7 of the armatures A1 and A2 are connected directly to positive and negative supply conductors 8 and 9, respectively, to which the "parallel-connecting" switches P and G are also adapted to connect the outer ends 4 and 5 of the field windings during parallel-machine operation. The "field-control" switches 1 and 2 are employed to connect suitable tap-points 10 and 11 of the field windings F1 and F2 to the supply conductors 9 and 8, respectively.

Inasmuch as an auxiliary control system for operating the illustrated switches, in accordance with the sequence indicated in Fig. 2, may be readily devised by those skilled in the art, I have not deemed it necessary to illustrate or describe such a control system in the present instance.

Assuming that it is desired to effect operation of the illustrated system, switches LS and JR are initially closed, as indicated by the sequence chart (line $a$, corresponding to the first position of an auxiliary governing controller which is not shown), whereby the motor circuit is established from the trolley through line switch LS, accelerating resistor 3, armature A1, the entire field winding F1, "series-connecting" switch JR, the entire field winding F2, armature A2, and thence to ground. The customary series relation of the motors for starting the associated vehicle is thus effected.

In the next three positions $b$, $c$ and $d$ of the governing controller, the switches R1, R2 and R3 are successively closed to gradually short-circuit the resistor 3 and effect a certain degree of acceleration of the illustrated motors.

To change over the motor connections to parallel relation, the well-known "shunting" type of transition is employed, whereby, first, the resistor-short-circuiting switches R1, R2 and R3 are opened and the "parallel-connecting" switch G is closed, thus completing a shunt circuit around the armature A2 and the field winding F2. The switch JR is then opened and the switch P is closed to complete the parallel connection of the machines, whereby one circuit is continued from the accelerating resistor 3, through armature A1, the entire field winding F1 and switch G, to negative conductor 9, while a second circuit is continued from the resistor 3 through conductor 8, switch P, the entire fielding winding F2, and armature A2 to conductor 9.

In the succeeding positions $e$, $f$ and $g$, the resistor-short-circuiting switches are again closed in succession to bring the motors to the speed corresponding to full-parallel relation.

To effect a further increase in the motor speed, the field-control switches 1 and 2 are closed and the parallel-connecting switches P and G are opened, as indicated in step *h* of the sequence chart, whereby the familiar reduced-field excitation is effected.

It will be seen that I have thus provided a control system wherein only five switches, or the equivalent, are employed for the purpose of connecting two motors in series relation and in parallel relation with both full-field and reduced-field excitation. The reduction in the number of switches, over the systems employed in the prior art to accomplish equivalent results, is effected by reason of the peculiar circuit connection of the switches P and G, which, in such prior systems, are employed only for the familiar "parallel-connecting" purpose and are never opened during parallel-motor operation. In the prior systems referred to, the switches P and G were maintained closed under such conditions, and additional switches were connected to the outer end and to the tap-point of each field winding. By employing the "parallel-connecting" switches P and G also for the purpose of connecting the outer ends of the field windings to the respective supply conductors 8 and 9, I have made it possible to eliminate two switches, with obvious advantages, as regards cost, size and weight of equipment.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a plurality of electric motors severally having armatures and having series-type field windings, each provided with a tap-point, of control means, including only five switches, one for connecting the motors in series relation, two for parallel relation with both terminals of each field winding active and two for parallel relation with only one terminal and the tap-point active, to cause the remaining portions of said field windings to be fully deënergized.

2. In a system of control, the combination with a plurality of electric motors severally having armatures and having series-type field windings, each provided with a tap-point, of means for joining the outer ends of the field windings to connect the motor in series relation, means for connecting said outer ends to the outer terminals of the non-corresponding armatures to connect the motors in parallel relation and means for connecting said tap-points to said outer terminals to effect reduced-field excitation.

3. In a system of control, the combination with a plurality of supply conductors, of a plurality of electric motors having outer armature terminals connected to the respective supply conductors, and having field windings, each provided with a tap-point, of five switches adapted to complete the following connections: from the outer end of one field winding to that of the other, from each of said outer ends to the respective supply conductors, and from each tap-point to the corresponding supply conductor.

4. In a system of control, the combination with a plurality of supply conductors, of a plurality of electric motors having outer armature terminals connected to the respective supply conductors, and having field windings each provided with a tap-point, of a "series-connecting" switch for joining the outer ends of the field windings to connect the motors in series relation, two "parallel-connecting" switches for joining said outer ends to the respective supply conductors to connect the motors in parallel relation, and two "field-control" switches for joining said tap-points to the corresponding supply conductors.

In testimony whereof, I have hereunto subscribed my name this 26th day of Oct. 1918.

HARRY R. MEYER.